(12) United States Patent
Patil et al.

(10) Patent No.: US 9,777,824 B2
(45) Date of Patent: Oct. 3, 2017

(54) COOLED GEAR HOUSING ASSEMBLY

(71) Applicant: Modine Manufacturing Company, Racine, WI (US)

(72) Inventors: Ashutosh Patil, Racine, WI (US); Christopher Chudy, Greenfield, WI (US); Robert Sherman, Milford, MI (US); Jason Braun, Mt. Pleasant, WI (US); Daniel Raduenz, Franklin, WI (US)

(73) Assignee: Modine Manufacturing Company, Racine, WI (US)

( * ) Notice: Subject to any disclaimer, the term of this patent is extended or adjusted under 35 U.S.C. 154(b) by 56 days.

(21) Appl. No.: 14/935,785

(22) Filed: Nov. 9, 2015

(65) Prior Publication Data

US 2016/0131244 A1    May 12, 2016

Related U.S. Application Data

(60) Provisional application No. 62/076,659, filed on Nov. 7, 2014.

(51) Int. Cl.
*F16H 57/04*     (2010.01)
*F16H 57/031*    (2012.01)
*F16H 57/029*    (2012.01)

(52) U.S. Cl.
CPC ....... *F16H 57/0417* (2013.01); *F16H 57/029* (2013.01); *F16H 57/031* (2013.01); *F16H 57/0423* (2013.01)

(58) Field of Classification Search
CPC .. F16H 57/0417; F16H 57/029; F16H 57/031; F16H 57/0423; F16H 57/04;
(Continued)

(56) References Cited

U.S. PATENT DOCUMENTS 1,365,438 A * 1/1921 Adamson ........... F01M 11/0004
                                                  165/179
2,687,784 A * 8/1954 Klackner ................ F16N 39/02
                                                  184/104.1
(Continued)

FOREIGN PATENT DOCUMENTS

DE         10124071 A1 * 12/2002   ......... F01M 11/0004
DE         10245791 A1 *  4/2004   ........... F16H 57/031
(Continued)

OTHER PUBLICATIONS

Machine translation of DE 10124071 A1 obtained on Mar. 2, 2017.*
Machine translation of DE 10245791 A1 obtained on Mar. 2, 2017.*

*Primary Examiner* — Adam D Rogers
(74) *Attorney, Agent, or Firm* — Michael Best & Friedrich LLP

(57) ABSTRACT

A cooled gear housing includes a first casing section and a second casing section joined together to define an internal volume of the gear housing assembly. A heat conducting membrane is arranged within the gear housing assembly to hydraulically separate a first portion of the internal volume from a second portion of the internal volume. Two or more meshed gears are located within the first portion of the internal volume. Coolant inlet and outlet ports are arranged on one of the casing sections, and are in fluid communication with the second portion of the internal volume.

12 Claims, 5 Drawing Sheets

(58) Field of Classification Search
CPC .............. F16H 57/0409; F16H 57/0412; F16H 57/0413; F16H 57/0415; F16H 57/021; F16H 57/042; F16N 39/02; F16N 39/04; F28D 15/00; F28D 15/0266; F28D 15/0233; Y10T 74/2189; F01M 2011/0025; F28F 2215/06; B60B 35/16
See application file for complete search history.

(56) References Cited

U.S. PATENT DOCUMENTS

| | | | | |
|---|---|---|---|---|
| 4,633,938 A * | 1/1987 | Schunck | ............. | F16H 57/0493 165/47 |
| 5,408,965 A * | 4/1995 | Fulton | ................... | F01M 5/002 123/196 AB |
| 5,839,327 A * | 11/1998 | Gage | .................. | F16H 57/0412 184/11.1 |
| 5,937,817 A * | 8/1999 | Schanz | ................. | F01M 5/002 123/195 C |
| 6,488,003 B2 * | 12/2002 | Karlsson | ............ | F01M 11/0004 123/196 AB |
| 6,997,238 B1 * | 2/2006 | Ruthy | ................. | F16H 57/0417 165/41 |
| 7,637,337 B2 * | 12/2009 | Stranges | ............ | F01M 11/0004 180/69.1 |
| 7,819,769 B2 * | 10/2010 | Beutler | .................. | F16H 57/04 475/161 |
| 9,038,609 B2 * | 5/2015 | Meshenky | .......... | F02B 29/0462 123/184.21 |
| 9,417,015 B2 * | 8/2016 | Connors | ................... | F28F 3/00 |
| 9,562,604 B2 * | 2/2017 | Katragadda | ......... | F16H 57/0417 |
| 2004/0177827 A1 * | 9/2004 | Hoyte | ................ | F01M 11/0004 123/196 AB |
| 2006/0054411 A1 * | 3/2006 | Fett | ..................... | F16H 57/0412 184/6.22 |
| 2011/0120408 A1 * | 5/2011 | Reese | ................ | F01M 11/0004 123/195 C |
| 2015/0354692 A1 * | 12/2015 | Gooden | ............. | F16H 57/0417 165/51 |

FOREIGN PATENT DOCUMENTS

| | | | | |
|---|---|---|---|---|
| DE | WO-2007124885 A2 * | 11/2007 | ......... | F16H 57/0417 |
| DE | 102010009509 A1 * | 9/2011 | ............. | B60K 17/16 |
| DE | 102011089189 A1 * | 6/2013 | ................ | F16P 1/02 |

* cited by examiner

COOLED GEAR HOUSING ASSEMBLY

BACKGROUND

Gears are commonly used to transfer power from one rotating element to another. Typically, the teeth of a first gear coupled to a first rotating shaft engage with the teeth of a second gear coupled to a second rotating shaft. The axes of the first and second rotating shafts can be parallel, perpendicular, or at some other angle, depending on the particular needs of the power transfer apparatus. Multiple such gears are often combined to accomplish a desired power transfer between an input shaft and one or more output shafts. This power transfer can effect a desirable transformation of the rotational velocity and torque, as well as a change in the orientation of the axis about which the rotation occurs.

Gears are typically contained within a housing to provide a gear housing assembly. The housing provides support for the shafts of the gears, ensuring the engagement of the gear teeth, and prevents debris from fouling the teeth, among other functions. Examples of such gear housing assemblies can be found in differentials and power transfer units, among others.

Differentials are typically used in automobiles, trucks, and other wheeled vehicles that utilize paired drive wheels in order to propel the vehicle. The differential operates by transmitting, through a series of engaging gears, a torque from the drive shaft of the vehicle to a pair of axially aligned but independently rotating axles, each of which connects to a driving wheel of the vehicle. Due to the independent rotation of each of the pair of axles, the driving wheels attached thereto can be rotated at non-equal speeds. Such operation is beneficial during, for example, the negotiation of a curve by the vehicle, when the driving wheel located radially outward of the curve must rotate at a faster rotational speed than the driving wheel located radially inward of the curve in order to prevent either dragging of the outer wheel or slipping of the inner wheel.

Power transfer units (PTUs) are used in automobiles, trucks, and other wheeled vehicles in which multiple spaced-apart wheeled axes of the vehicle are simultaneously driven by the engine and transmission. As one example, automobiles featuring "all-wheel drive" typically have a front axle driven directly by the drive shaft of the vehicle, and a rear axle driven by a power transfer unit. The power transfer unit operates by transmitting, through a series of engaging gears, a torque from a first shaft located at the front of the vehicle and extending in the width direction of the vehicle, to a second shaft extending perpendicular to the first shaft towards the rear axle of the vehicle, in order to drive the rear axle.

High-viscosity oil is typically contained within the housing of the differential or PTU to adequately lubricate the engaging gears therein. The rotation of the gears churns the oil, thereby ensuring that the meshed gear surfaces are continuously lubricated. Consequently, a pump or other means to move the oil through the casing is typically not required.

Under certain operating conditions, the oil used to lubricate the gears can become heated to temperatures in excess of the recommended operating temperature of the oil. Such operating conditions can include (but are not limited to) high-load operation of the vehicle, high ambient temperatures, restricted airflow over the gear casing, and combinations of the above. This overheating can be detrimental to the gear housing assembly, and can result in premature failure of the gears contained therein.

SUMMARY

According to an embodiment of the invention, a cooled gear housing includes a first casing section and a second casing section joined together to define an internal volume of the gear housing assembly. A heat conducting membrane is arranged within the gear housing assembly to hydraulically separate a first portion of the internal volume from a second portion of the internal volume. Two or more meshed gears are located within the first portion of the internal volume. Coolant inlet and outlet ports are arranged on one of the casing sections, and are in fluid communication with the second portion of the internal volume.

In some embodiments, the casing sections include generally planar flanges that are joined together. An outer periphery of the membrane is arranged between the flanges to provide a fluid seal for a coolant, and a fluid seal for a lubricant.

In some embodiment the cooled gear housing includes one or more fluid flow paths disposed within the second portion of the internal volume. The one or more fluid flow paths extend between the coolant inlet and the coolant outlet.

In some embodiments the one or more fluid flow paths are at least partially formed into the membrane. In other embodiments they are at least partially defined by a fin plate joined to a surface of the membrane.

According to another embodiment of the invention, a cooled gear housing includes a casing that surrounds a plurality of meshed gears. A heat conducting membrane is spaced apart from at least a portion of the walls of the casing to define a coolant volume between the membrane and that portion of the walls. A coolant inlet port and a coolant outlet port are in fluid communication with the coolant volume, and are each coupled to at least one of the casing walls.

In some embodiments the casing includes a first section and a second section that are joined together at a flange joint. The membrane can be joined to the first and second section at the flange joint in order to provide a leak free seal.

In some embodiments one or more fluid flow paths are disposed within the coolant volume between the coolant inlet port and the coolant outlet port. In some such embodiments, the one or more fluid flow paths are at least partially formed into the membrane. In some other embodiments the one or more fluid flow paths are at least partially defined by a fin plate joined to a surface of the membrane.

DETAILED DESCRIPTION

Figure 1:
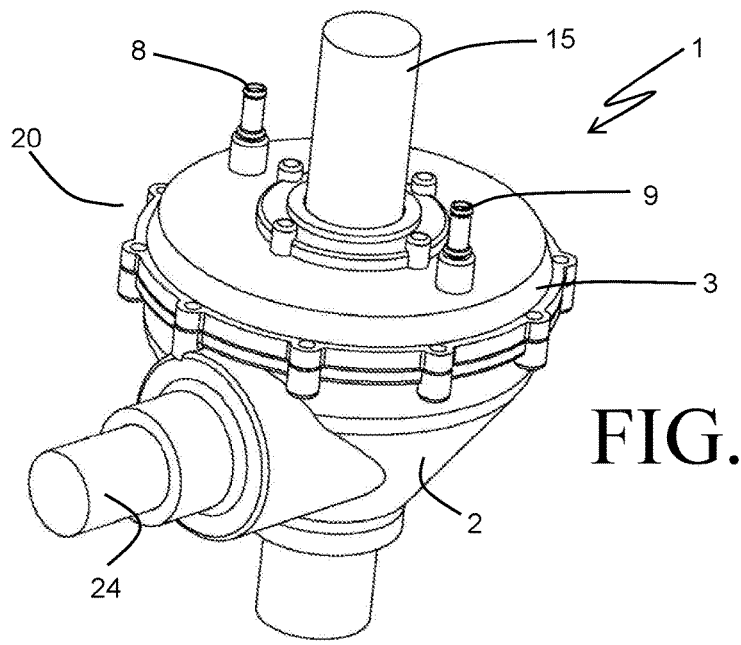
FIG. 1 is a perspective view of a cooled gear housing according to an embodiment of the invention.
Figure 2:
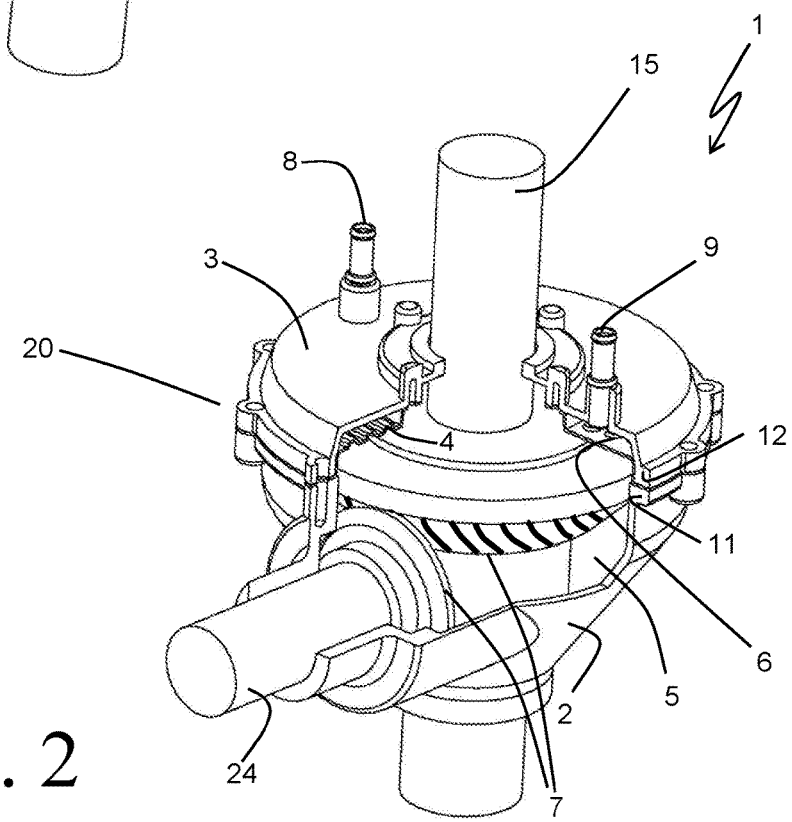
FIG. 2 is a partially sectioned perspective view of the cooled gear housing of FIG. 1.
Figure 3:
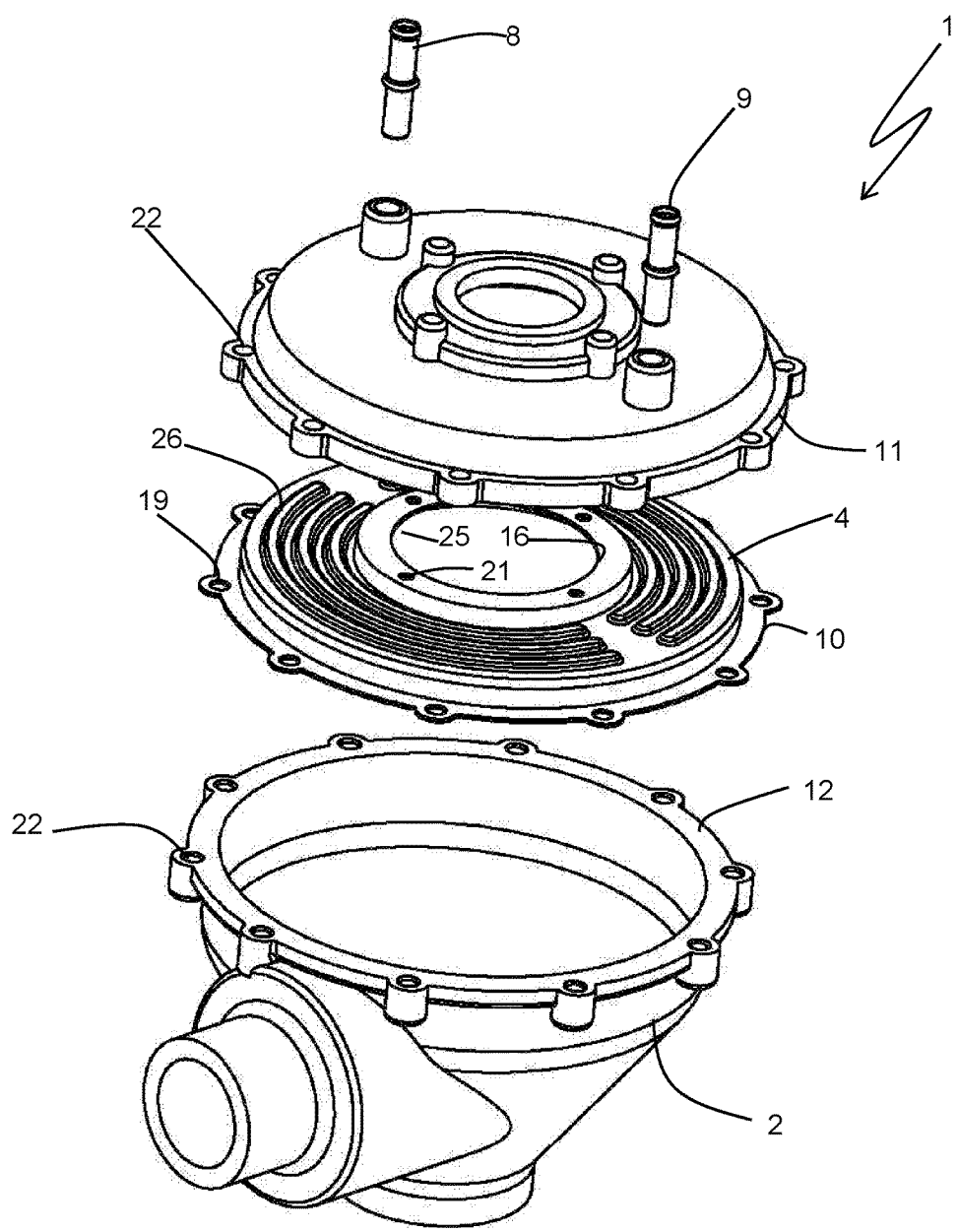
FIG. 3 is an exploded perspective view of the cooled gear housing of FIG. 1, with certain internal parts removed.
Figure 4:
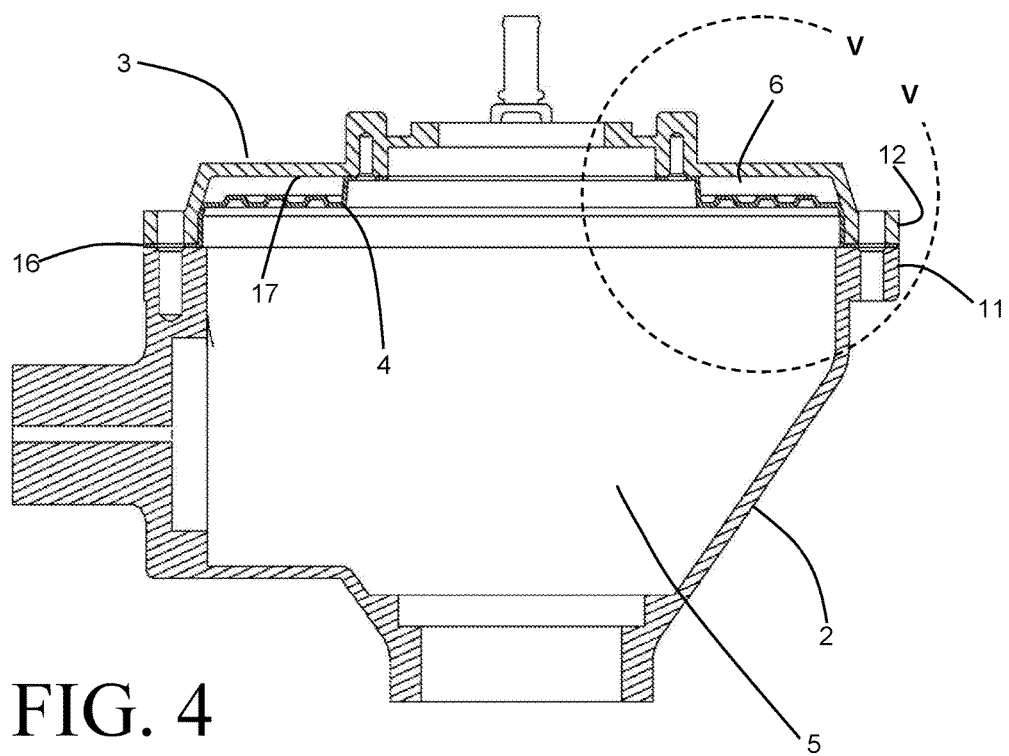
FIG. 4 is a sectioned side view of the cooled gear housing of FIG. 1, with certain internal parts removed.
Figure 5:
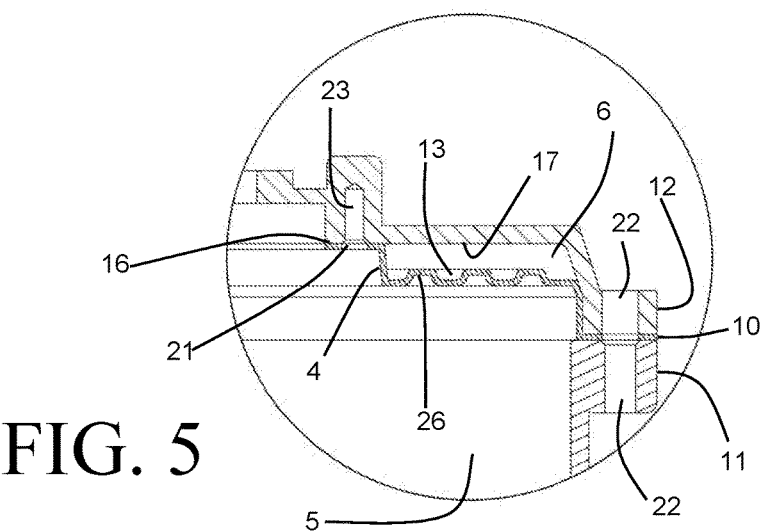
FIG. 5 is a partial section view of the portion V-V of FIG. 4.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

An embodiment of a cooled gear housing 1 is depicted in FIGS. 1-5. In some of the figures the internal gears and the shafts to which the gears are connected have been removed for purposes of clarity. The cooled gear housing 1 contains a plurality of meshed gears 7 that engage to provide power transmission between a central shaft 15 extending through the gear housing 1 and a transversely oriented shaft 24 extending into the gear housing 1. In some embodiments a torque supplied to the centrally extending shaft 15 is transmitted by the meshed gears 7 to the transverse shaft 24. In other embodiments a torque supplied to the transverse shaft 24 is transmitted by the meshed gears 7 to the centrally extending shaft 15. The cooled gear housing 1 can be employed in various power transmission applications, including as a power transfer unit (PTU) or as a differential, among others.

The cooled gear housing 1 includes a casing 20 to surround the gears 7. The casing 20 includes a first casing section 2 and a second casing section 3. The casing sections 2, 3 are joined together by way of a flange joint formed by a flange 11 provided at an outer periphery of the casing section 2, and a corresponding flange 12 provided at the outer periphery of the casing section 3. Fastening locations 22 are arranged along the perimeter of the flanges 11, 12 in order to secure the two casing sections to one another using fasteners (not shown). The fastening locations 22 can include through-holes in one or both flanges to allow for a fastener (e.g. a screw or a bolt) to extend through one or both flanges. In some embodiments, the fastening locations 22 in one of the flanges 11, 12 are through-holes, whereas the fastening locations 22 in the other of the flanges 11, 12 are threaded blind holes to receive fasteners that extend through the fastening locations 22 of the first flange in order to engage the corresponding fastening locations 22 in the second flange.

A heat conducting membrane 4 is provided within the casing 20, and divides the internal volume of the casing 20 into a first internal volume 5 disposed on one side of the membrane 4, and a second internal volume 6 disposed on the opposing side of the membrane 4. The membrane 4 is at least partially spaced away from the inner walls 17 of the casing section 4, and the internal volume 6 is defined within that spacing. An outer periphery 10 of the membrane 4 is located at the flange joint between the casing sections 2 and 3, so that the outer periphery 10 is clamped between the flanges 11, 12 in order to create fluid seals at the flange joint. Apertures 19 are provided at locations along the outer periphery 10 corresponding to the fastening locations 22 in order to allow for the penetration of fasteners engaging the fastening locations 22 through the membrane 4.

A central aperture 25 of the membrane 4 allows for the penetration of the central shaft 15 through the membrane 4. An inner periphery 16 bounds the central aperture 25, and is secured against inner surfaces 17 of the casing section 2. Apertures 21 are provided through the inner periphery 16 in locations corresponding to fastening locations 23 provided in the casing section 2 so that the membrane 4 can be secured against the inner surfaces 17 using fasteners (not shown). In this way, the central shaft 15 can extend through the casing 120 without passing through the internal volume 6. The membrane 4 can be secured to the casing section 11 prior to assembly of the casing sections 2 and 3.

In the fully assembled cooled gear housing 1, the meshed gears 7 are located within the internal volume 5. Oil or other lubricants are also contained within the internal volume 5 in order to lubricate the meshed gears. The elevated rotational speeds of the gears 7, along with the substantial contact forces between the gears 7 as the torque is transmitted, can lead to substantial heating of the oil during operation The internal volume 6 is hydraulically separated from the internal volume 5 by the membrane 4. A coolant inlet port 8 and a coolant outlet port 9 are provided on the casing section 3 and provide for fluid communication between the internal volume 6 and a coolant system to provide and receive a liquid coolant to and from the cooled gear housing 1. The inner volume 6 thus functions as a coolant volume that provides for fluid connection between the coolant inlet port 8 and the coolant outlet port 9.

As the flow of coolant passes through the inner volume 6, it scrubs against the surface of the membrane 4. Simultaneously, the movement of the gears within the internal volume 5 directs the lubricating oil against the opposing surface of the membrane 4. The heat generated by the meshing of the gears is thereby transferred via the lubricant (which is continuously being flung throughout the internal volume 5 by the gear movement) to the membrane 4, and is then convectively transferred to the coolant passing over the opposing surface of the membrane 4 to be carried to heat rejection means (e.g. a radiator) located elsewhere in the cooling system. As a result, the lubricant is maintained at an appropriate operating temperature despite the heating effects of the gears 7.

In order to optimize the transfer of heat between the lubricant and the coolant, the membrane 4 has to have a relatively high thermal conductivity (i.e. it has to be a heat conducting membrane). To that end, it can be preferable for the heat conducting membrane 4 to be constructed of a metal such as aluminum, copper, brass, steel, titanium. Alternatively, the heat conducting membrane 4 can be constructed of a plastic with thermally conductive material impregnated into it. In some embodiments the heat conducting membrane 4 can be constructed of multiple materials, with the inner periphery 16 and the outer periphery 10 being constructed of a material that is optimized for fluid sealing, and the central portion between the peripheries 10 and 16 being constructed of a material that is optimized for heat transfer.

In order to further improve the rate of heat transfer between the fluids, multiple flow paths 13 can be provided within the coolant volume 4 for the coolant to pass through. The flow paths 13 can be provided by embossments 26 formed into the membrane 4. Such embossments 26 provide additional surface area for both the lubricant and the coolant, as well as provide for somewhat tortuous flow paths 13 for the coolant, thereby potentially increasing the rate of convective heat transfer.

Figure 6:
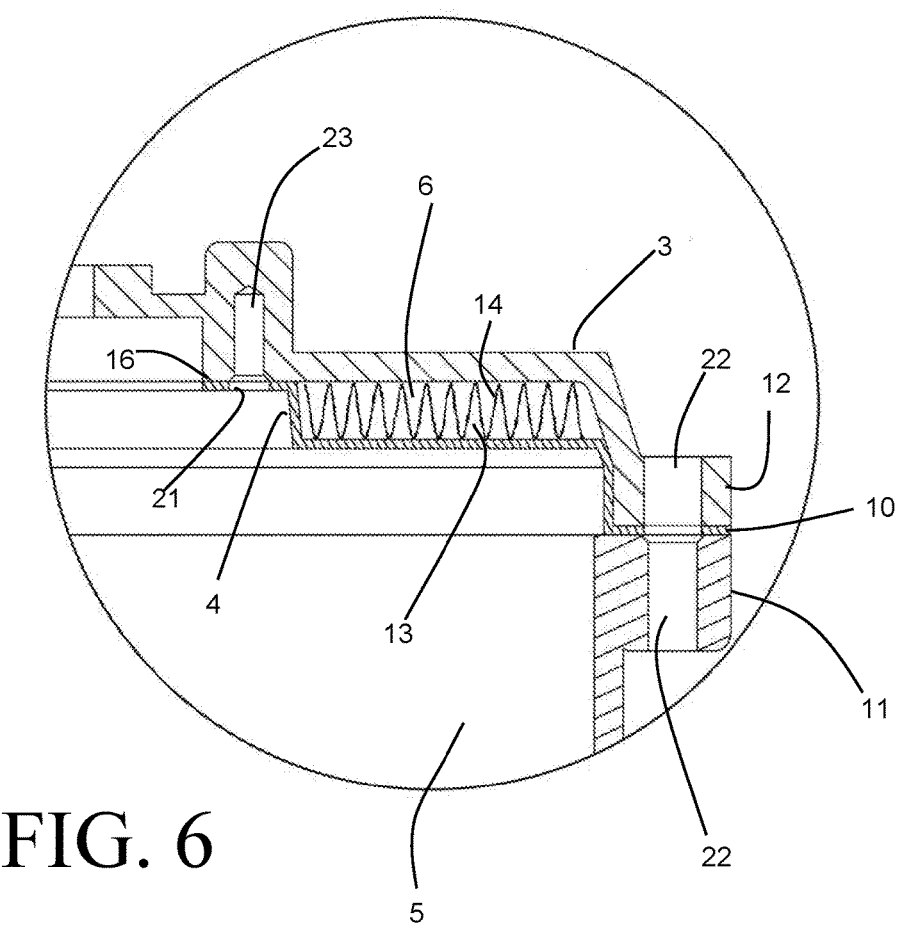
FIG. 6 is a partial section view similar to that of FIG. 5, but showing alternative features.

By capturing the outer periphery 10 of the membrane 4 within the clamped joint between the flanges 11 and 12 of the casing sections 2 and 3, a first fluid seal can be provided at the clamped joint for the lubricant, and a second seal can be there provided for the coolant. This avoids the need for welding or otherwise joining in a permanent fashion in order to create one or both of the fluid seals. The flange joint is preferably a joint that can be readily disassembled for servicing An alternative embodiment to the embossments 26 is shown in FIG. 6 (with gears and shafts removed from view), and includes a corrugated fin plate 14 that is provided within the coolant volume 6 to define the flow paths 13 for the coolant flow. Such a fin plate 14 can provide for a greater number of smaller channels for the coolant flow, thereby increasing the turbulence of the coolant flow and providing for even greater heat transfer enhancement. The fin plate 14 can be provided as a loose component within the coolant volume 6, or it can be bonded to the surface of the heat conducting membrane 4, thereby providing additional heat transfer surface area in addition to defining the channels 13.

Figure 7:
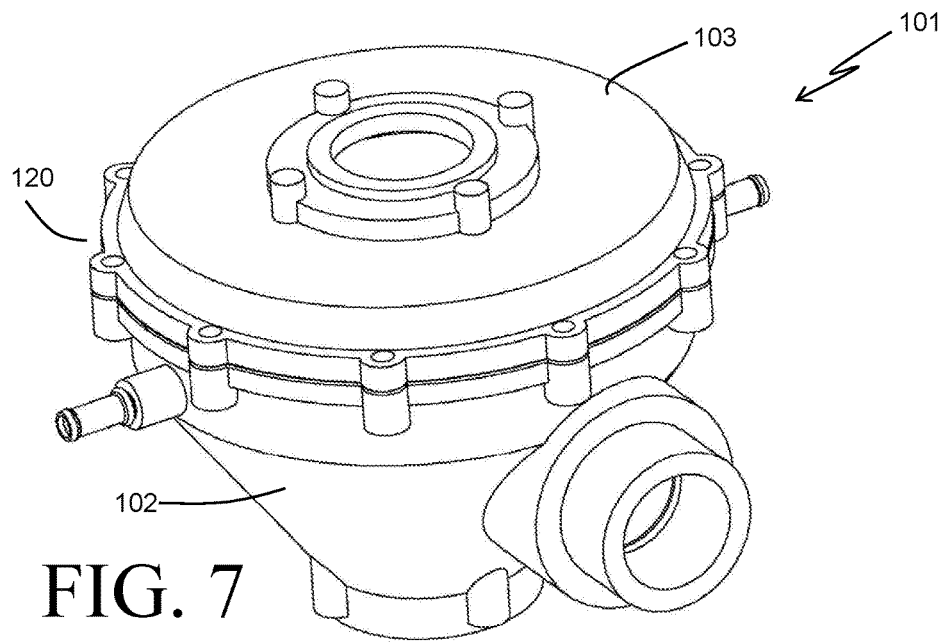
FIG. 7 is perspective view of a cooled gear housing according to another embodiment of the invention, with certain internal parts removed.
Figure 8:
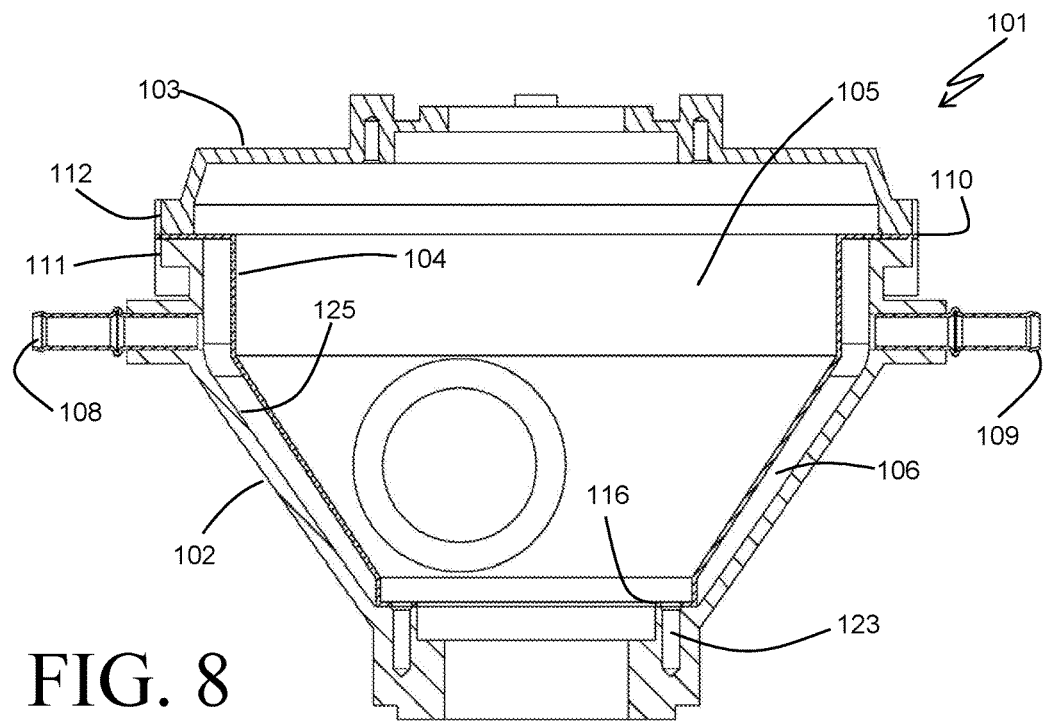
FIG. 8 is a sectioned side view of the cooled gear housing of FIG. 7.

An alternative embodiment 101 of a cooled gear housing is depicted in FIGS. 7 and 8. The cooled gear housing 101 is similar in most respects to the cooled gear housing 1, and includes a casing 120 that is split into a first casing section 102 and a second casing section 103. A heat conducting membrane 104 is again provided within the cooled gear housing, and has an outer perimeter 110 that is clamped at the joint between the flange 111 of the casing section 102 and the flange 112 of the casing section 103.

As best seen in FIG. 8, the membrane 104 bounds a first internal volume 105, together with the casing section 103, with the meshed gears and lubricating oil occupying that internal volume. A separated internal volume 106 is bounded by opposing surfaces of the membrane 104, as well as by internal walls 125 of the casing section 102. In contrast to the earlier described embodiment, the cooled gear housing 101 thus defines a bowl-shaped coolant volume 106 that more completely surrounds the meshed gears contained within the cooled gear housing 1 in order to provide for more enhanced cooling of the lubricant that is flung against the membrane 104 by the gears.

The membrane 104 has an inner periphery 116 that is joined to the casing section 102 through fastening locations 123 provided in the casing section 102, in a similar fashion to that described earlier for the membrane 4. A coolant inlet port 108 and a coolant outlet port 109 are provided at opposing sides of the casing section 102 to provide for the inflow and outflow of coolant to and from the coolant volume 106.

Instead of or in addition to cooling the lubricant, the flow of coolant passing through the gear housing 1 or 101 can be used to heat the lubricant during those conditions wherein the lubricant temperature if below the desired operating temperature. Such a condition can occur, for example, when the gear housing 1 or 101 is provided as a component of a vehicle that is operating in cold ambient conditions. Most gear lubricants of the type that are used in gear housings exhibit a marked increase in viscosity at these low ambient temperature conditions. This high viscosity can result in excessive torque being required to accomplish the desired power conversion, leading to decreased operating efficiency. Such a decrease in efficiency is economically undesirable, and can also lead to fuel efficiencies that fall short of regulated levels. During such operating conditions, the coolant can be quickly heated to an elevated temperature prior to being delivered to the inlet port 8, and heat from the coolant can be transferred through the membrane 4 into the lubricant in order to increase its temperature and decrease its viscosity. Such performance can be especially desirable during start-up operation in cold weather.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

We claim:

1. A cooled gear housing comprising:
   a first casing section and second casing section joined together to define a first and a second internal volume of the gear housing;
   a heat conducting membrane arranged within the gear housing to hydraulically separate the first internal volume from the second internal volume;
   two or more meshed gears located within the first internal volume;
   a coolant inlet port and a coolant outlet port arranged on one of the first and second casing sections, the coolant inlet port and coolant outlet port being in fluid communication with the second internal volume; and
   a central shaft extending through the first casing section, the second casing section, and the membrane, an inner periphery of the membrane being joined to one of the first and second casing sections to fluidly isolate coolant within the second internal volume from the central shaft.

2. The cooled gear housing of claim 1 wherein the first casing section includes a first generally planar flange and the second casing section includes a second generally planar flange joined to the first generally planar flange, an outer periphery of the membrane being arranged between the first and second generally planar flanges to provide a first fluid seal for the coolant and a second fluid seal for a lubricant.

3. The cooled gear housing of claim 1 further comprising one or more fluid flow paths disposed within the second internal volume between the coolant inlet port and the coolant outlet port.

4. The cooled gear housing of claim 3, wherein the one or more fluid flow paths are at least partially formed into the membrane.

5. The cooled gear housing of claim 3, wherein the one or more fluid flow paths are at least partially defined by a fin plate joined to a surface of the membrane.

6. The cooled gear housing of claim 1, wherein the membrane at least partially surrounds the two or more meshed gears.

7. A cooled gear housing comprising:
   a casing having walls surrounding a plurality of meshed gears;
   a heat conducting membrane spaced apart from at least a portion of the walls of the casing to define a coolant volume between the membrane and said portion of the walls of the casing, the membrane having one or more inwardly facing surfaces;

a coolant inlet port in fluid communication the coolant volume, coupled to at least one of said walls of the casing;
a coolant outlet port in fluid communication the coolant volume, coupled to at least one of said walls of the casing; and
a central shaft extending through the casing and the membrane, an inner periphery of the membrane being joined to the casing to fluidly isolate coolant within the coolant volume from the central shaft.

8. The cooled gear housing of claim 7, wherein the casing includes a first section and a second section joined together at a flange joint, the membrane being joined to the first and second sections at the flange joint to provide a seal.

9. The cooled gear housing of claim 7 further comprising one or more fluid flow paths disposed within the coolant volume between the coolant inlet port and the coolant outlet port.

10. The cooled gear housing of claim 9, wherein the one or more fluid flow paths are at least partially formed into the membrane.

11. The cooled gear housing of claim 9, wherein the one or more fluid flow paths are at least partially defined by a fin plate joined to a surface of the membrane.

12. The cooled gear housing of claim 7, wherein the membrane at least partially surrounds the plurality of meshed gears.

* * * * *